US008218809B2

(12) United States Patent
Wilson

(10) Patent No.: US 8,218,809 B2
(45) Date of Patent: Jul. 10, 2012

(54) MICROPHONE VIDEO SCREEN/MONITOR DISPLAY

(76) Inventor: Micha'El Tracy Wilson, Appleton, MN (US)

( * ) Notice: Subject to any disclaimer, the term of this patent is extended or adjusted under 35 U.S.C. 154(b) by 1177 days.

(21) Appl. No.: 12/034,132

(22) Filed: Feb. 20, 2008

(65) Prior Publication Data

US 2008/0205684 A1 Aug. 28, 2008

Related U.S. Application Data

(60) Provisional application No. 60/902,136, filed on Feb. 20, 2007.

(51) Int. Cl.
*H04N 5/66* (2006.01)

(52) U.S. Cl. ....................................... 381/388; 455/66.1

(58) Field of Classification Search .................. 381/388; 348/739; 455/66.1, 903, 575.1, 556.1, 41.2, 455/69, 569.1
See application file for complete search history.

(56) References Cited

U.S. PATENT DOCUMENTS 6,795,715 B1 * 9/2004 Kubo et al. ................ 455/556.1
7,103,318 B2 * 9/2006 Levinsohn .................. 455/66.1

* cited by examiner

*Primary Examiner* — Roy Potter
(74) *Attorney, Agent, or Firm* — Nawrocki, Rooney & Sivertson, P.A.

(57) ABSTRACT

A video screen/monitor display microphone attachment. The video display is fixed to a microphone and has an internal surface substantially conforming to an outer surface of the microphone.

2 Claims, 11 Drawing Sheets

MICROPHONE VIDEO SCREEN/MONITOR DISPLAY

CROSS-REFERENCE TO RELATED APPLICATIONS

This is a regular application filed under 35 U.S.C. §111(a) claiming priority, under 35 U.S.C. §119(e) (1), of provisional application Ser. No. 60/902,136, previously filed Feb. 20, 2007 under 35 U.S.C. §111(b).

TECHNICAL FIELD

The present invention deals broadly with the field of microphones, and microphone attachments. More narrowly, however, it deals with the display of a visual presentation at the microphone.

In a preferred embodiment, the microphone includes its conventional components. The microphone, however, would also be fitted with a self-contained video screen monitor display unit so as to enable the display of moving pictures, video graphics, video TV station logos, non-moving video images, video commercial advertising and/or other related video.

BACKGROUND OF THE INVENTION

Microphones are used in numerous ways. One is in the entertainment industry. Another is in the news media industry. Both may employ a device or devices fixed to a microphone in order to identify the name of a TV show, a TV logo, TV station call letters and the name of the station, etc. Such microphones are typically adorned with the attachment to not only identify the user, but also to be aesthetically pleasing as well.

Structures in the prior art, however, have not changed in at least thirty years. They typically comprise nothing more than a contoured shape with a foam filler and a presentation comprising a sticker or paint, of molded plastic, or other means to effect the desired presentation on the surface.

Such prior art structures, however, are limited in function, because they are only able to present a fixed display which does not change in whole or in part.

The present invention is a device which addresses these problems, and overcomes the limitations of the prior art. The present invention serves to offer a device which allows for the presentation of multiple video graphics and enables the changing of graphics without the need to replace any part of the device.

SUMMARY OF THE INVENTION

The present invention deals with microphone attachments. More particularly, however, the invention deals with the presentation of any moving or non-moving video screen/monitor display at one or more sides of a microphone, including video pictures, video graphics, video TV station logos, video commercial advertising and other media related video. The video screen/monitor display thus enables multiple series of video graphics, rather than being limited to a fixed presentation which does not change.

Modern technology such as the computer chip, video circuitry, USB cable and the cartridge are employed to facilitate the transmission of video graphics to the surface area.

The transmission may be effected by an LED display, LCD display and any other means by which video transmission can be accomplished.

The present invention is thus an apparatus for enabling the presentation of a video display at one or more sides of a microphone, thereby enabling the display of multiple series of media-related video graphics. This overcomes the limitations of the prior art. More specific features and advantages obtained in view of those features will become apparent with reference to THE DETAILED DESCRIPTION OF THE INVENTION, appended claims and accompanying drawing figures.

DETAILED DESCRIPTION OF THE INVENTION

Figure 1:
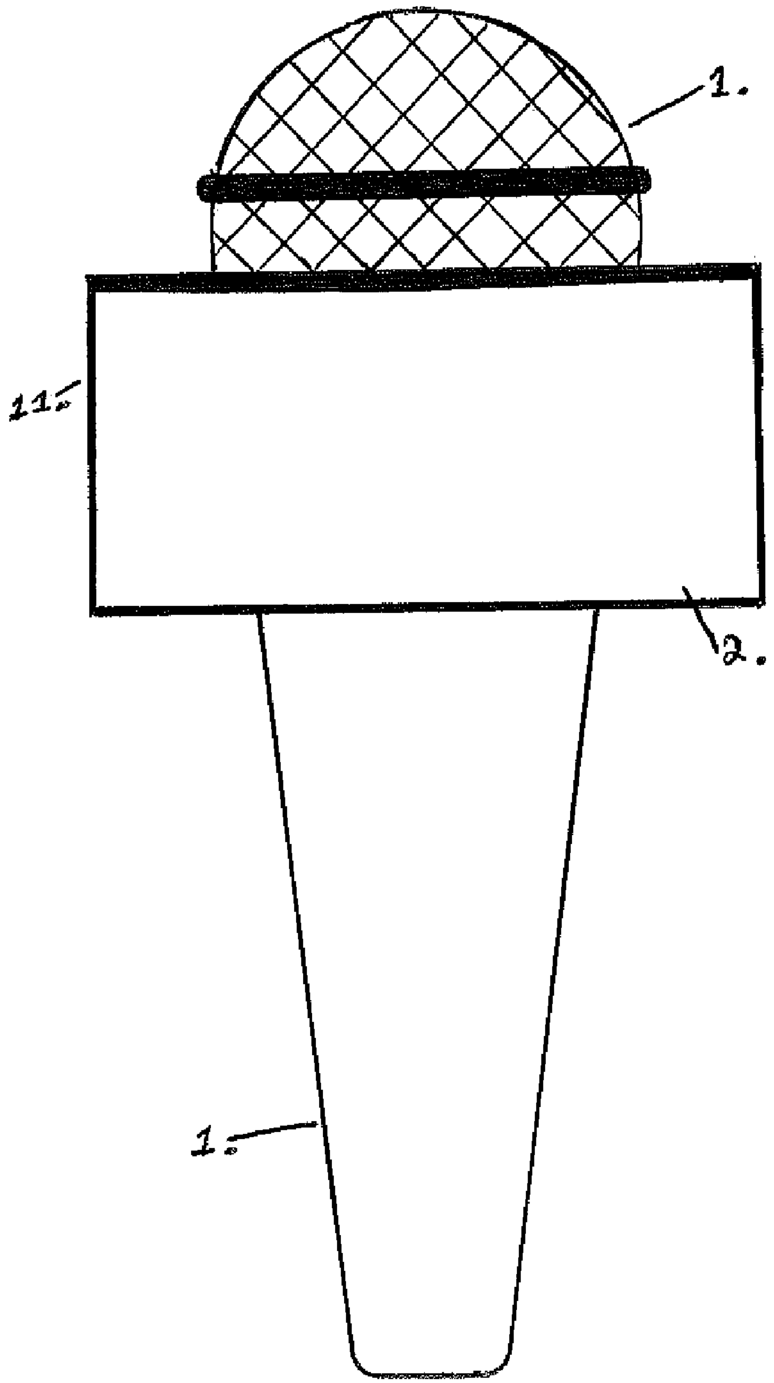
FIG. 1 is a front elevational view of a microphone employing the video screen/monitor display in accordance with the present invention.

Referring now to the drawings wherein like reference numerals denote like elements throughout the several views, FIG. 1 illustrates a microphone 1, which incorporates a video display in accordance with the present invention. The microphone 1 is shown fitted with a monitor casing 11 for the video screen/monitor display 2. FIG. 1 illustrates the microphone 1 as having an assembly attached to it which includes the monitor casing 11. Such a monitor casing 11 has a contour which conforms to a surface of a monitor body. This relationship will be discussed in more detail hereinafter.

FIG. 1 also shows the video screen/monitor display 2 as being received within the monitor casing 11. The present invention serves to maintain such a video screen/monitor display 2 in an orientation at one or more sides of a microphone 1.

Figure 2:
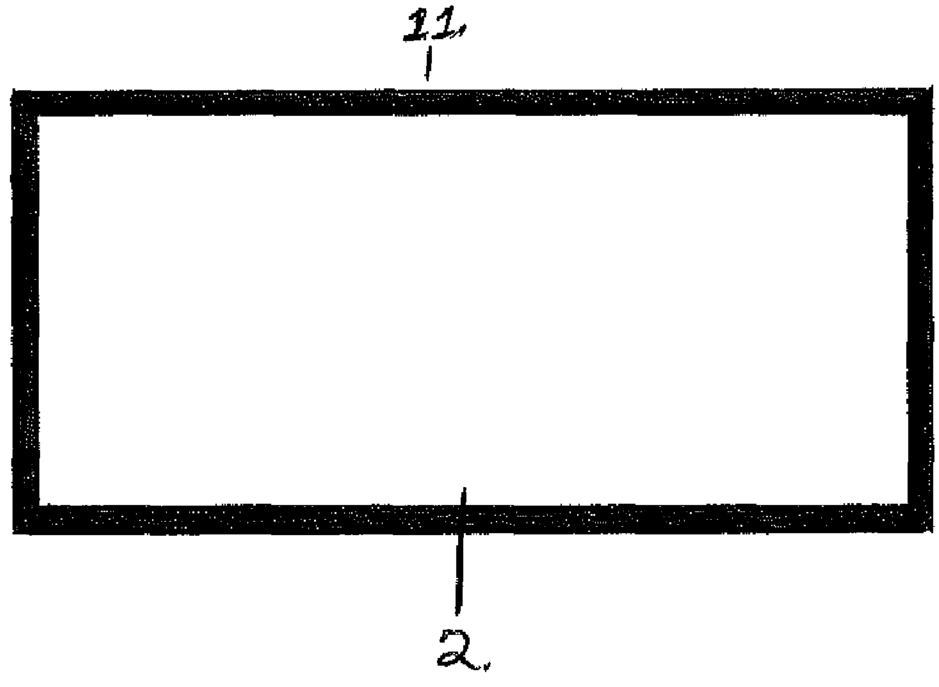
FIG. 2 is a front elevational view, illustrating the video screen/monitor display in accordance with the present invention.

FIG. 2 is a front elevational view illustrating the monitor casing 11 and the video screen/monitor display 2.

Figure 3:
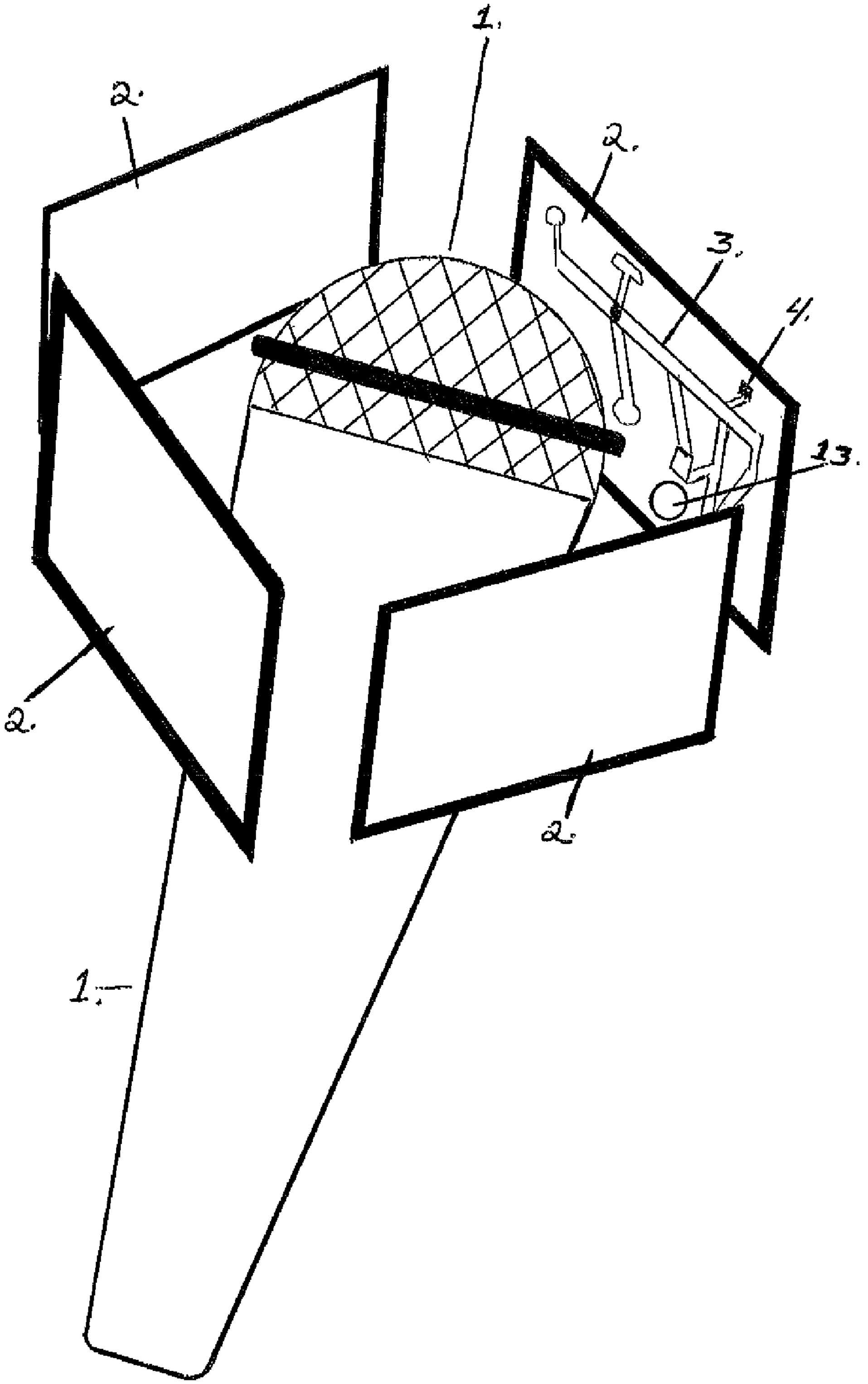
FIG. 3 is an exploded perspective view illustrating various parts of the present invention.

FIG. 3 is an exploded perspective view with the top 14 removed. The microphone 1 and the video screen/monitor display 2 are illustrated. Circuitry 3 effects generation of video on screen/monitor display 2. Circuitry 3 employs technology that is known to those of skill in the art in the field of video technology. Such technology is necessary for the transmission of video imaging, and may be on one or more sides of, inside of, or on the back of the video display.

FIG. 3 also illustrates other components such as a computer chip 4 which may be necessary for the storage and transmission of data. It will be appreciated that the circuitry 3 may incorporate more than one computer chip. FIG. 3 also illustrates a battery 13 for powering the circuitry 3, and the video screen/monitor display 2. It should be noted that power may also be provided by the battery of microphone 1 where the microphone is wireless.

Figure 4:
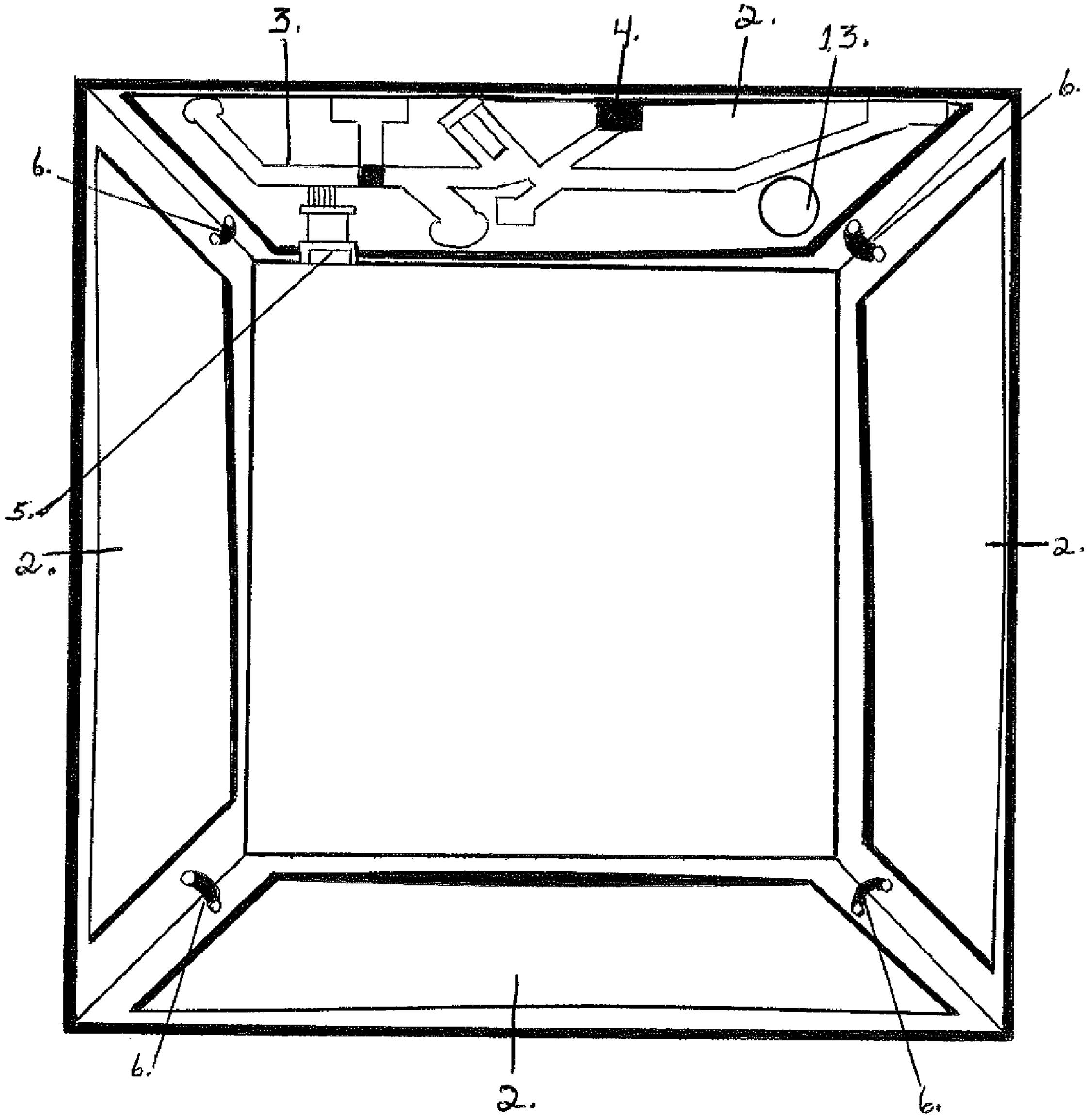
FIG. 4 is a top view illustrating an array of screen/monitor displays.

FIG. 4 is a top view illustrating each video screen/monitor display 2 with each display 2 connected by transmission wiring 6 or fiber optics. The circuitry 3 is again illustrated along with a microchip 4 for transmitting video images to the video screen/monitor display 2 via transmission wiring 6. Such structure enables video images to be transmitted to each display.

FIG. 4 further illustrates an interface station 5 for USB cable 7 on the video screen/monitor display 2. This enables the uploading of data from a computer 8 to the video screen/monitor display 2. It should be noted that the interface station 5 may be made to receive either a USB cable 7 or a cartridge 9. The cartridge 9 may be pre-programmed by a person using a computer 8. A battery 13 which functions to power the video screen/monitor display 2 is also illustrated.

Figure 5:
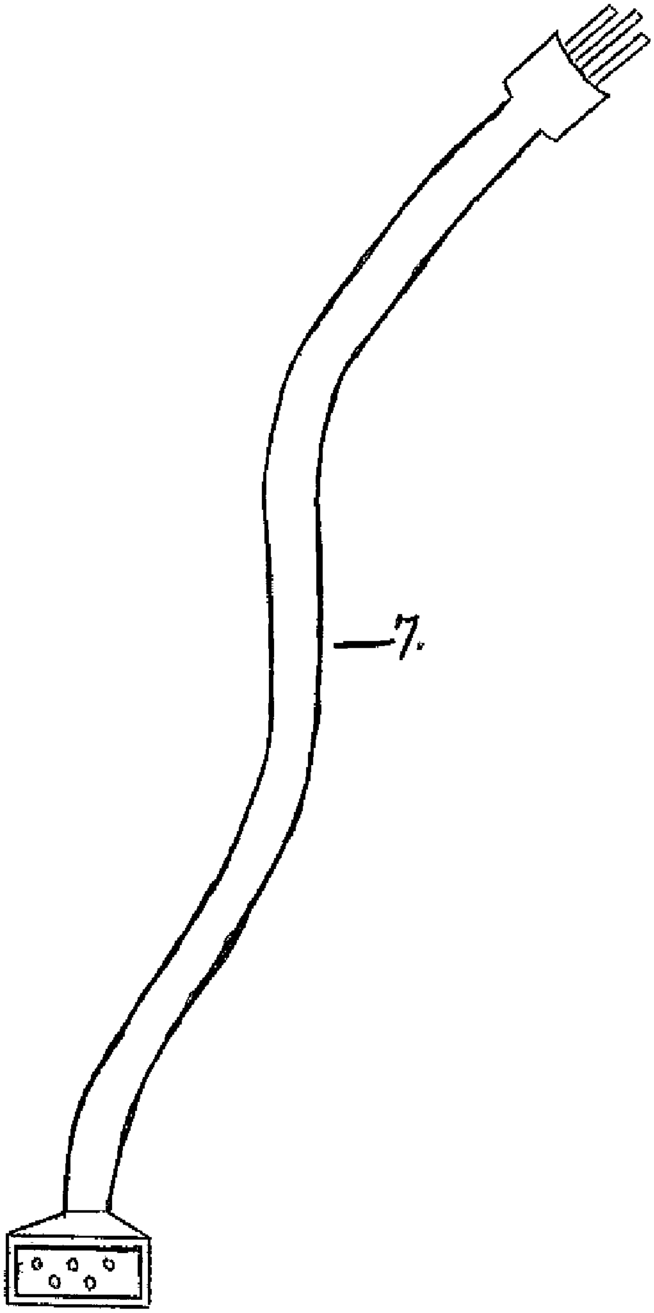
FIG. 5 is a front elevational view of a USB cable.
Figure 6:
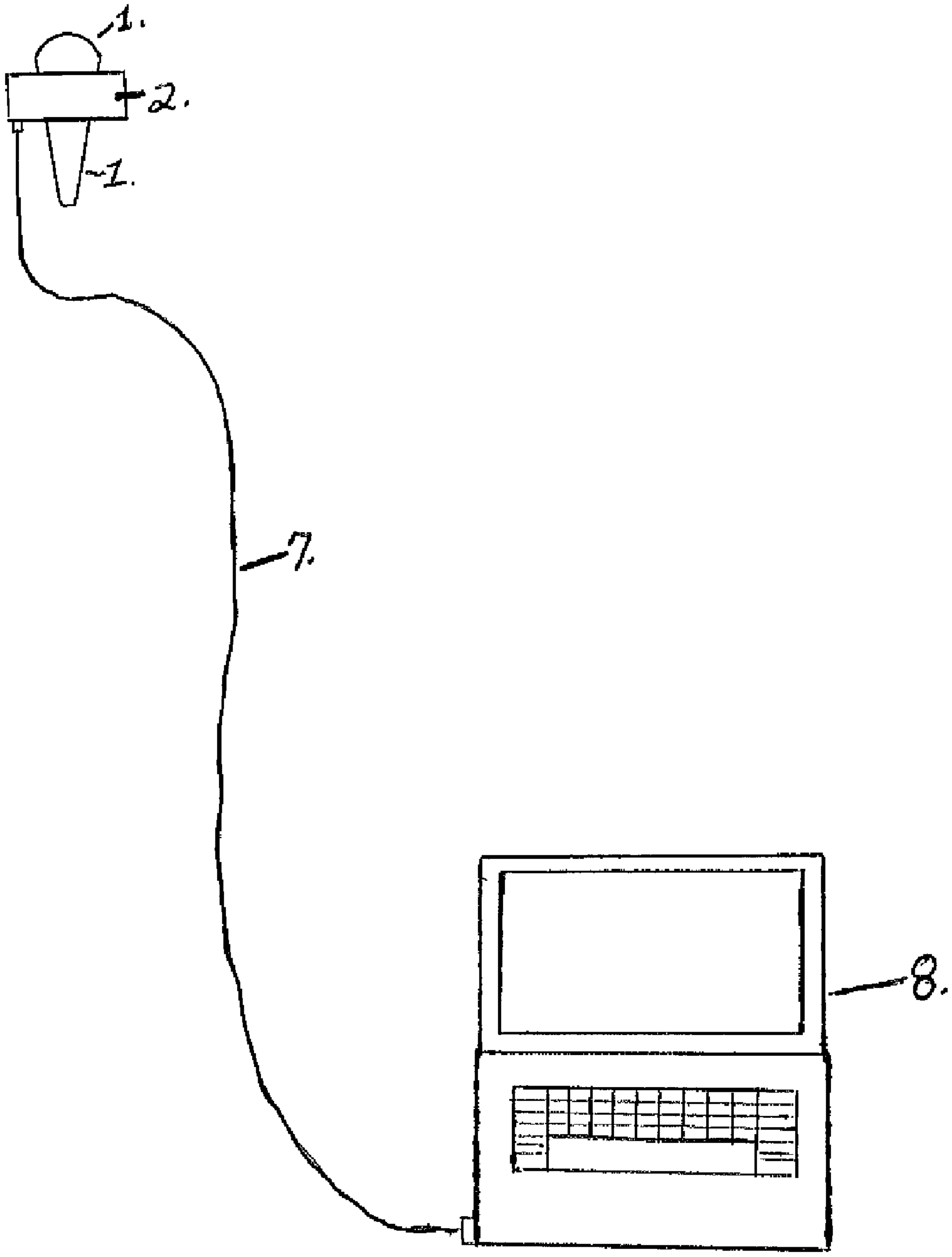
FIG. 6 is a front elevational view illustrating the integration of the present invention with a computer using the USB cable to upload the video graphics.

FIG. 5 illustrates a USB cable 7, the use of which is further illustrated in FIG. 6.

FIG. 6 is a front view illustrating how a USB cable 7 is employed to enable the video screen/monitor display 2 to interface with a computer 8 in order to upload data and video graphic images from a computer 8 to a video screen/monitor display 2 via interface station 5 to be stored in a computer chip 4. This serves the purpose of transmitting data and images by way of circuitry 3 and transmission wiring 6 to the surface of the video screen/monitor display 2. Display 2 can be secured in the monitor casing 11 and attached to microphone 1.

Figure 7:
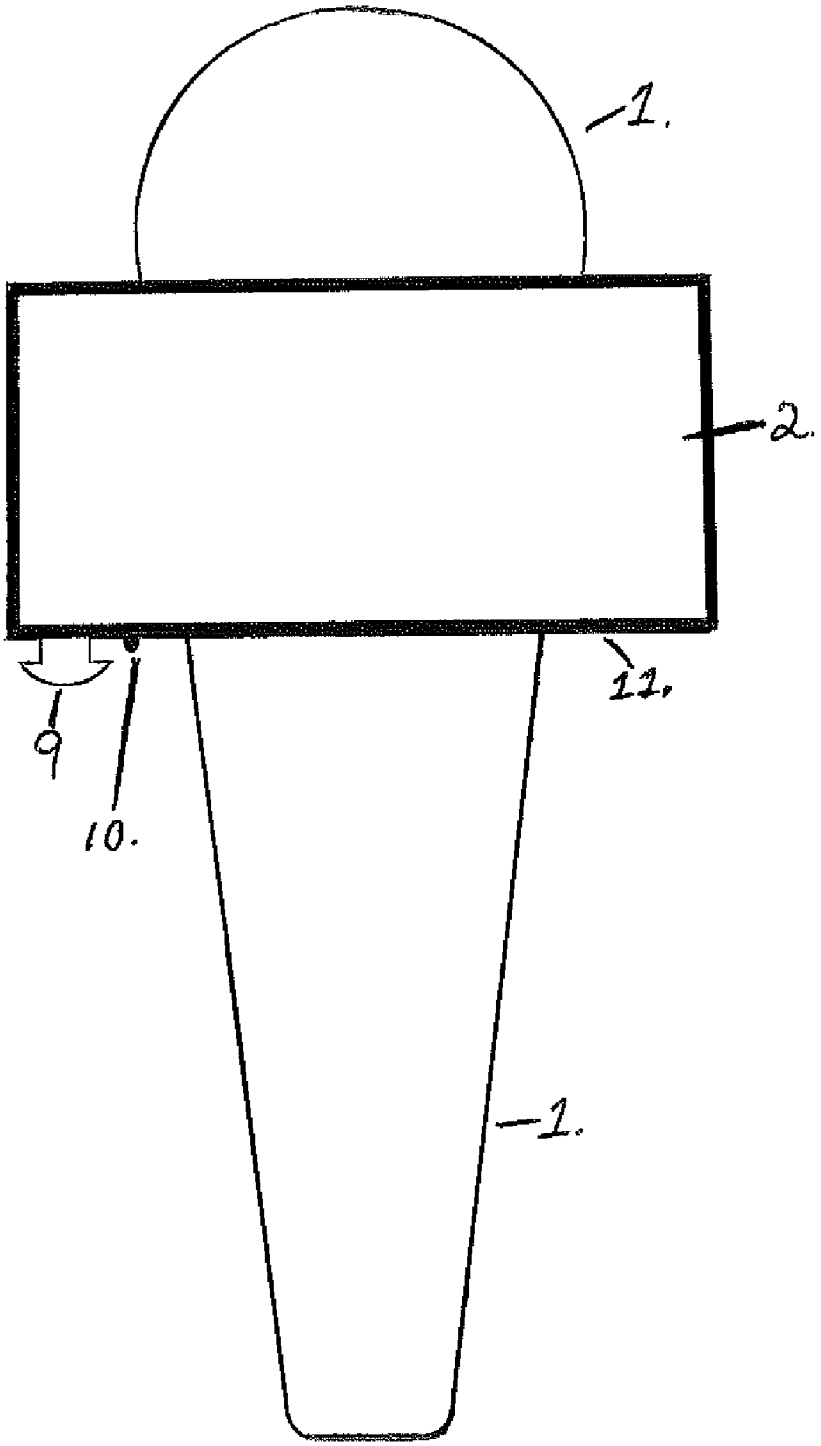
FIG. 7 is a front view of a microphone employing the present invention and using a pre-programmable cartridge.

FIG. 7 is a front view of microphone 1 illustrated as having attached to it the monitor casing 11. Casing 11 houses the video screen/monitor display 2 which presents the transmitted video imaging to the surface of the display. Also shown in FIG. 7 is an on/off switch 10 which, when switched on, activates video screen/monitor display 2.

FIG. 7 further illustrates the use of a pre-programmable cartridge 9. It should be noted that the present invention may employ pre-programmed cartridge 9 so as to not limit the ways in which the video screen/monitor display 2 receives programming. The cartridge 9 may be used as an alternative for receiving and making use of data and programming.

Figure 8:
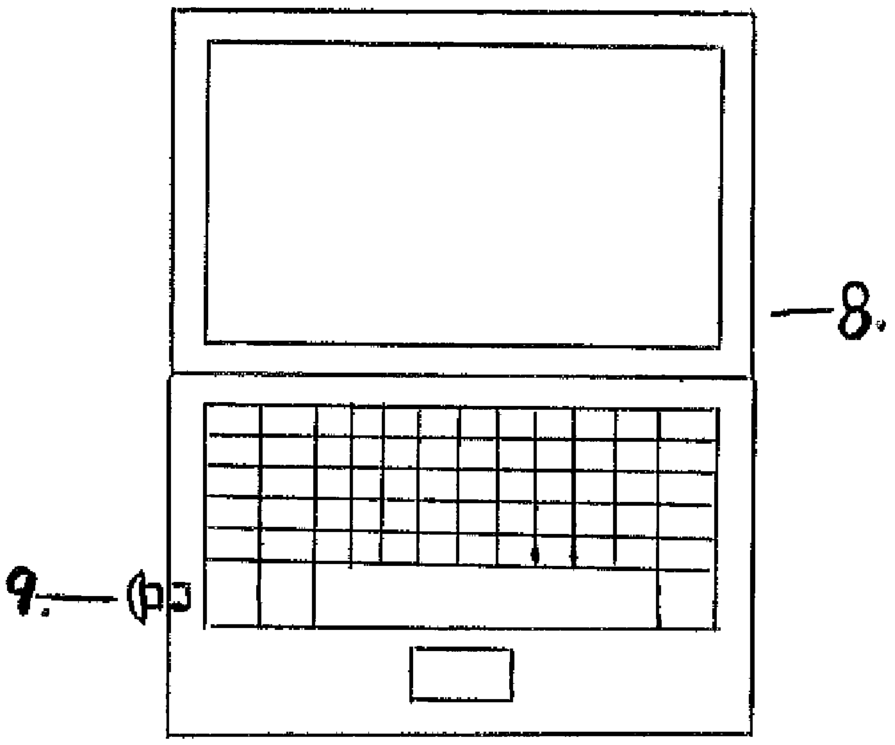
FIG. 8 is a front elevational view of a computer illustrating a cartridge programmed before its use in connection with the present invention.

FIG. 8 is a front view of a computer 8 illustrating cartridge 9 interfacing with computer 8 in order to be programmed prior to the insertion of the cartridge 9 into the interface station 5 of the video screen/monitor display 2.

Figure 9:
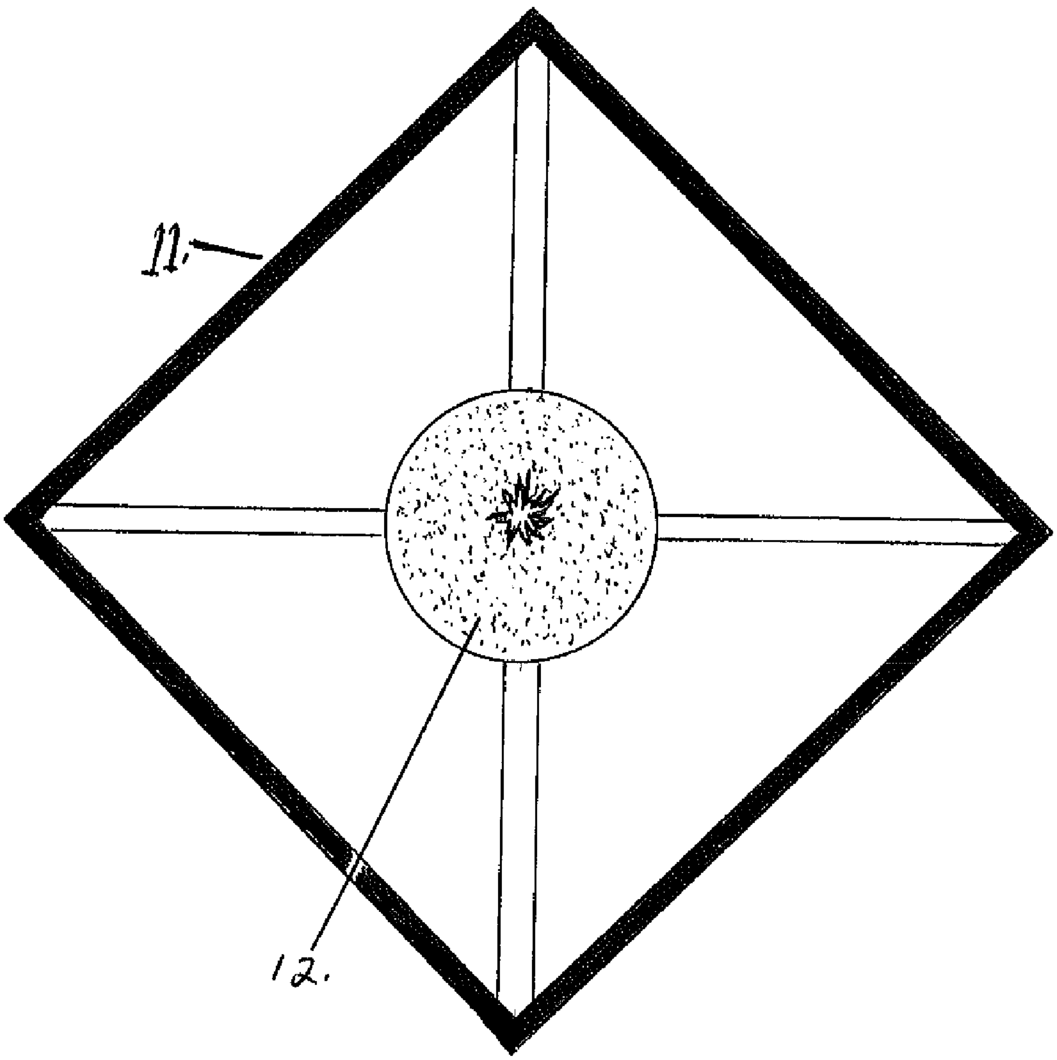
FIG. 9 is a top view of the present invention including a monitor casing and foam filler.

FIG. 9 is a top view of the monitor casing 11 housing the video screen/monitor display 2. The monitor casing 11 may be made out of plastic, wood, metal or any other malleable or forgeable material which can be molded or fashioned into a desired shape.

FIG. 9 also illustrates a foam filler 12 which serves to secure the video screen/monitor display 2 to microphone 1. The foam filler 12 is inserted into the monitor casing 11. A small aperture that runs through the foam filler 12 from top to bottom is provided in the center of the foam filler 12. This allows the microphone 1 to slip through the center of the foam filler 12. The hole is tight enough to maintain the display at a desired level and orientation on the microphone 1.

The invention is not limited to a foam filler 12 for attachment purposes, and it will be appreciated that various forms of custom attachments could be employed.

Figure 10:
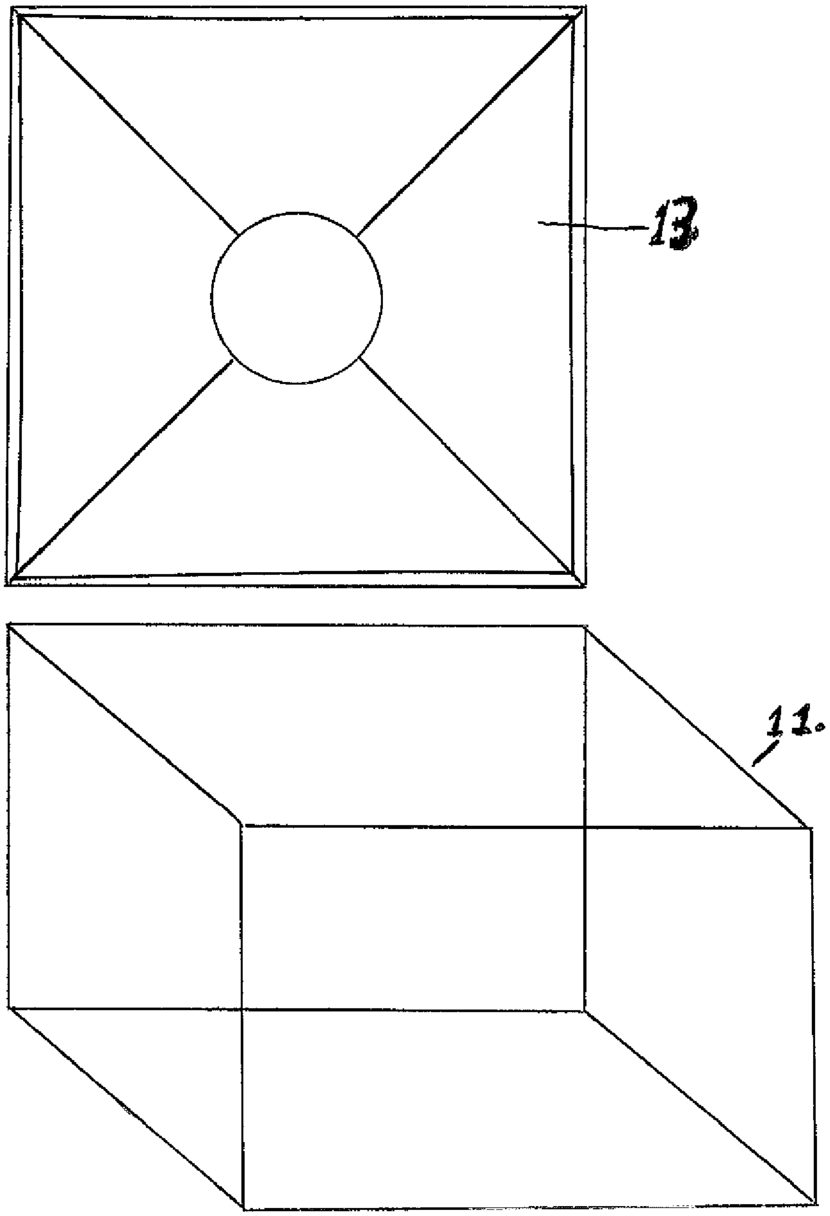
FIG. 10 is an illustration of a monitor casing of the present invention with the top removed.

FIG. 10 is an elevational view of the monitor casing 11 with its top and bottom lifted off.

Figure 11:
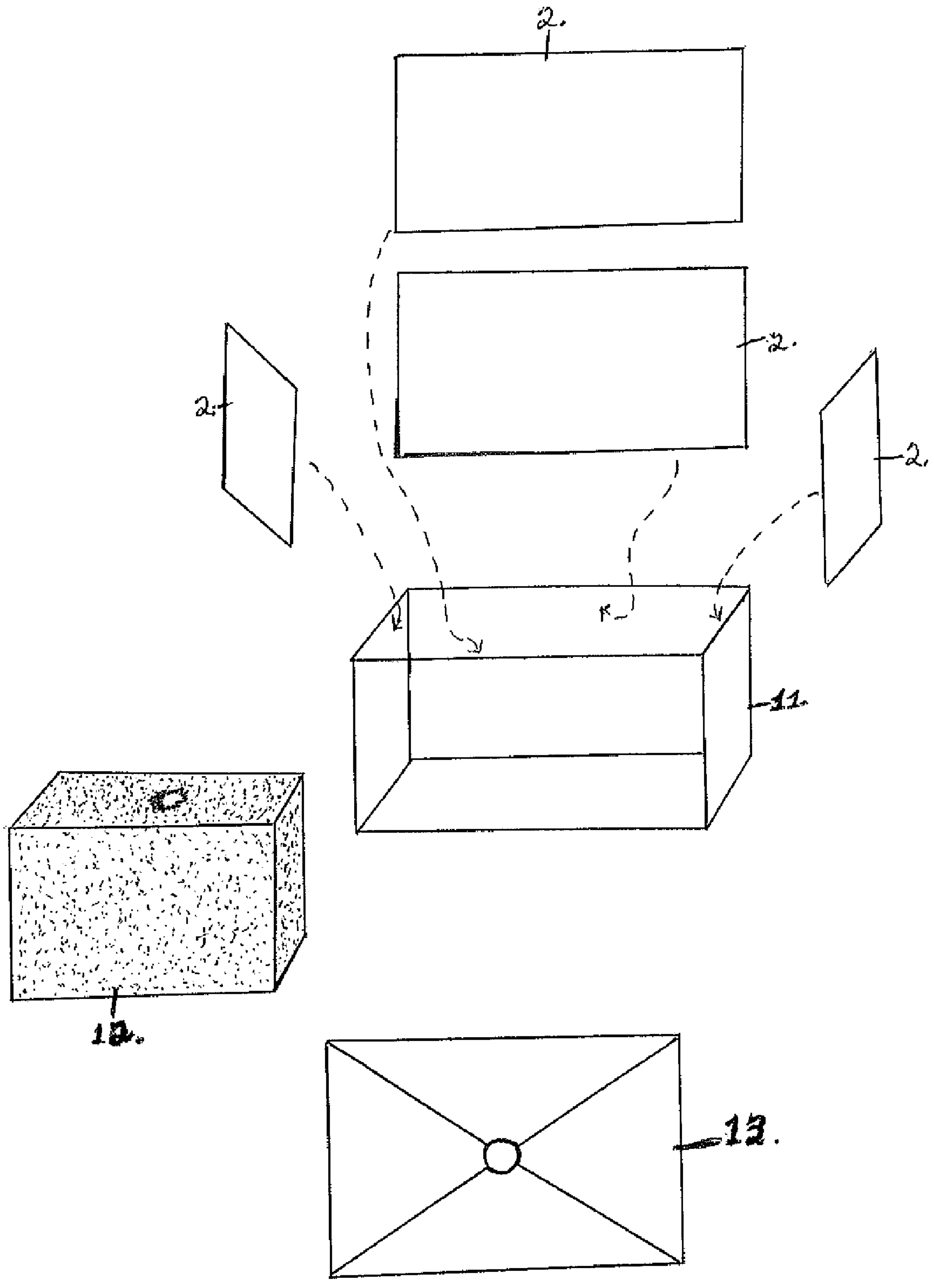
FIG. 11 is an exploded view illustrating an array of video screen/monitor displays and monitor casing and foam filler.

FIG. 11 is an elevational front view of the monitor casing 11 illustrating how the video screen/monitor(s) 2 can be inserted into the front, rear and left and right sides of the monitor casing 11. FIG. 11 also shows the top and bottom of the monitor casing 11 along with the foam filler 12. The tight hole in the middle through which a microphone 1 will be inserted is shown. The foam filler 12 is contoured to a shape which will correspond to the shape of the monitor casing 11. Casing 11 is, in turn, contoured to the shape of the video screen monitor display 2.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. In combination with a broadcast microphone:

(a) a first video display mounted on at least one side of the microphone, said first video display having a generally planar surface for presenting one or both of static and moving images;

(b) a second video display mounted on another side of the microphone, said second video display having a generally planar surface substantially orthogonal to said generally planar surface of said first video display, for presenting one or both of static and moving images;

(c) electronic media storing said images; and (d) means for transmitting said images from said electronic media to said video displays for presentation thereby.

2. A broadcast microphone having mounted thereto, on each of various sides thereof, a video screen/monitor having a substantially planar surface for displaying graphic electronic media including media TV station call letters, logos, insignias and other graphic images, either still or animated; means for storing said graphic electronic media; and means for uploading said graphic electronic media to said video screen/monitor, substantially planar surfaces of adjacent video screens/monitors being substantially orthogonal.

* * * * *